Nov. 24, 1964  E. B. HEDGEPETH  3,158,301
SUPPORT STRUCTURE FOR VEHICLES
Filed Aug. 2, 1962

INVENTOR.
EDWARD B. HEDGEPETH
BY
HIS ATTORNEY

United States Patent Office 3,158,301
Patented Nov. 24, 1964

3,158,301
SUPPORT STRUCTURE FOR VEHICLES
Edward B. Hedgepeth, 2819 St. Mary's Way,
Salt Lake City, Utah
Filed Aug. 2, 1962, Ser. No. 214,397
5 Claims. (Cl. 224—42.07)

The present invention relates to support structure for vehicles such as hard-top, coupe, and sedan automobiles and trucks, and, more particularly, to a new and improved support structure for supporting a load above the top of the vehicle.

In the past many types of support structure have been devised for supporting loads above the tops of vehicles such as automobiles. Familiar, of course, are luggage carriers which employ suction cups bearing against the top of the vehicle and drain strip, elongate attachments for securing the same in place. Suction cups have the disadvantage of marring surface finishes and of creating small pressure areas on the top of the vehicle which may tend to dent or otherwise deform the same. Drain strips attachments of themselves are often insufficient to hold loads of any size in place.

The inventor has devised prior hereto, support constructions for automobiles which support loads solely at the bumpers of the vehicle. This is described in detail in the inventor's copending patent applications which are referenced herein in the body of the specification. Supporting loads above the vehicle is generally well provided for by bumper connections to the support structure, providing the latter is braced in a suitable manner. However, and where "convertible" automobiles are not under consideration, the inventor has devised a unique saddle for carrying the forward portion of the load over a distributed surface area of the top of the vehicle and, advantageously, at that portion of the vehicle's top or roof which is most suitably braced by virtue of the construction characteristics of the automobile, while still utilizing the rear bumper to carry the rear portion of the load.

Accordingly, an object of the present invention is to provide new and improved support structure for vehicles so that the latter may carry loads over the tops thereof.

A further object of the invention is to provide a unique saddle construction in certain support structure for vehicles, which saddle construction will distribute the loads carried by the automobile at the front portion thereof over an enlarged, distributed surface area, thereby avoiding surface marring, denting or other deformation of the material of the automobile top and insuring that an automobile may carry a maximum load overhead.

A further object of the invention is to provide saddle construction in certain support structure, for an automobile or other vehicle, which is adjustable so that the strongest part of the top of the towing vehicle may be utilized for carrying loads.

A further object of the invention is to provide a saddle construction for support structure for automobiles which exactly conforms to transverse roof contours of various makes of automobiles, and which may be adjusted to provide maximum support and yet sufficient door clearance.

The features of the present invention which are believed to be novel are set forth with particularly in the appended claims. The present invention, both as to its organization and manner of operation, together with further objects and advantages thereof, may best be understood by reference to the following description, taken in connection with the accompanying drawing in which:

Figure 1:
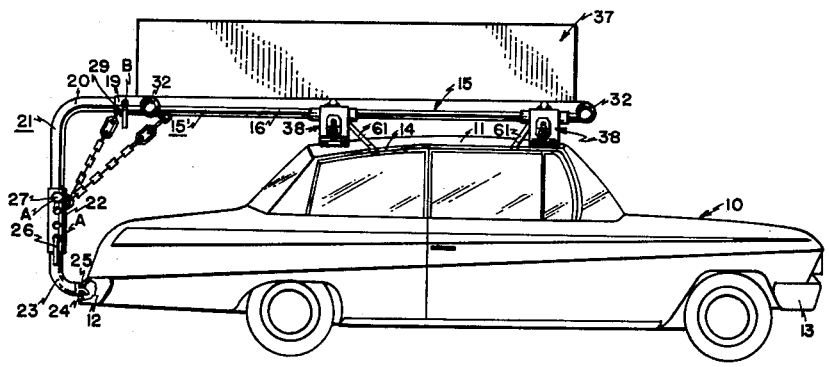
FIGURE 1 is a side elevation of a vehicle carrying support structure as contemplated by the present invention.

In FIGURE 1 the vehicle 10 comprises an automobile having a top 11, front and rear bumpers 13 and 12, drain strips 14 on both sides thereof, and other conventional construction components. The components above pointed out are delineated merely for the purpose of understanding the nature and relationship of the present invention with respect thereto.

Figures 4, 5, 6:
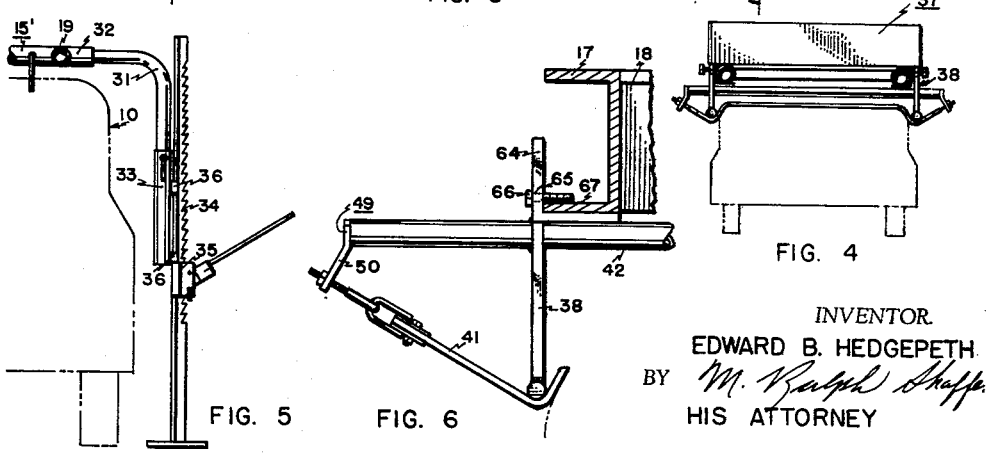
FIGURE 4 is a rear view of the automobile support structure in FIGURE 1.
FIGURE 5 is a rear view, similar to FIGURE 4, but illustrating the structure as jacked up so that the automobile may be driven away from the support structure.
FIGURE 6 illustrates an optional construction in connection with the saddle construction of the support structure wherein channel-configured beams are employed in the frame.

The support structure 15 itself includes mutually spaced, longitudinal beams 16 which may either take the form of cylindrical tubes, as in FIGURE 1, or channels 17 as in FIGURE 6.

Transverse members 18 are welded to beams 16 (or 17) to form the composite frame structure 15'. The transverse members 18 themselves may have any one of a number of configurations such as angles, channels, or tubes.

The longitudinal, mutually spaced beams 16 may provide at their rearward ends, rear support receptacles 19 for receiving a respective L-configured members 20 forming a part of support means 21. Support means 21 also includes sleeve 22 and a lower bumper support, of L-configuration as at 23, which includes a lower depending hook 24 engaging rear bumper 12 at aperture 25 thereof. Support means 21 at each position rearwardly of vehicle 10 is retained together by withdrawable pins 26 and 27 of either bolt or L-configurated nature, inserted in aligned apertures A of corresponding parts. Aligned apertures B accommodate pin 29 which secures the L-configured member 20 to rear support receptacle 19 of the frame 15'. Thus far, the above structure is fully described in the inventor's copending application, Serial No. 154,443 filed November 24, 1961, and entitled, Support Construction, which is fully incorporated by reference herein. As more fully explained in this copending application, when it is desirous that the vehicle be free from the support structure the latter may be supported by jack means over the vehicle so that the vehicle may be driven away. Such can be accomplished by the insertion of L-configured members 31 preliminarily inserted in sides receptacles 32 (front and rear), of support frame 15', with the former being welded, pinned, or otherwise secured to jack engagement members 33, and the latter being slideably disposed upon jack bars 34 and adapted for hoisting by conventional jacks 35. U-configured guides 36 are welded to engagement member 33 and accomplish the slideable retention of engagement member 33 with respect to jack bar 34. This portion of the structure is likewise displayed in detail in the above identified patent application and also in an additional copending application by the same inventor entitled, Collapsible Cabin and Accommodating Support Structure for Automobiles, Serial No. 188,742, filed April 19, 1962, the latter application also being made a part of the disclosure hereof by way of reference and full incorporation.

At this point it should be noted that the support structure 15 may bolt to and carry a carrier, collapsible cabin, or other structure as at 37 in FIGURE 1. Attachment of item 37 to the support structure 15 may be performed in any conventional manner as by bolting, for example.

The crux of the present invention resides in the provision of saddle construction 38 as illustrated in FIGURE 1. The saddle construction may be two or more in number, or even one if desired, and should be spaced along the top or roof area 11 of the vehicle 10 at positions which are the most rigid and which are provided the greatest support by virtue of the vehicle's construction.

Figure 2:
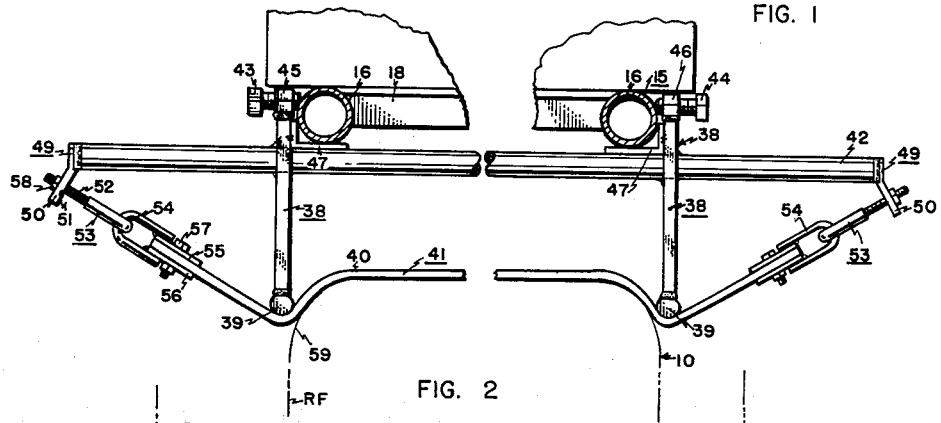
FIGURE 2 is a front elevation, partially broken away for convenience of illustration, of the saddle construction of the present invention, and is taken at a point forward of the vehicle in FIGURE 1 looking toward the rear thereof.
Figure 3:
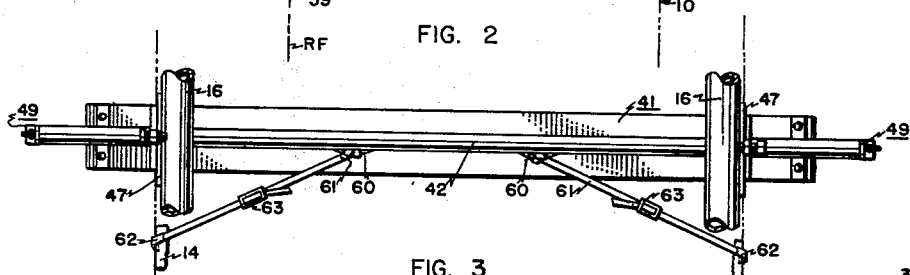
FIGURE 3 is a plan of the structure illustrated in FIGURE 2.

The saddle construction 38 is shown with particularity in FIGURES 2 and 3 wherein it is seen that the same advantageously includes depending legs 38 preferably being advantageously contoured or having welded or otherwise secured thereto, cylindrical bearing members 39 which bear upon the upper surface 40 of elongate flexible saddle 41. The latter may advantageously take the form of a webbed belting of a width of from 2″ to 8″ and of a length exceeding the width of the automobile or other vehicle with which the saddle construction 38 is to be employed. In the embodiment illustrated in FIGURE 2, a pair of stubbed angle members 47 are rigidly secured to depending legs 38 as by welding, and are also welded to cross bar 42 at positions therealong such that the stubbed angle members 47 may engagingly support the beams 16 (or 17 in FIGURE 6) of frame 15′. The saddle construction 37 may be locked to the frame 15′ by tightening down set screws 43 and 44 within nuts 45 and 46, the latter being welded to respective depending legs 38. Other than the frictional retention, shown by virtue of set screws or bolts 43 and 44, other types of frictional or nonfrictional locking engagement may be supplied as between beam 16 of frame 15′ and the saddle construction 37. Of course, it is possible that the saddle construction may be securely welded to the frame at the stub angle members 47. However, a releasable construction as illustrated in FIGURES 2 and 6, for example, is preferred.

The cross-bar 42, welded to depending legs 38, as hereinbefore illustrated, includes end retainer ears 49 which are both welded thereto at opposite ends thereof and which include outwardly directed flanges 50. The respective flanges 50 are respectively provided with apertures 51 which accommodate the shanks 52 of eyebolts 53. Eyebolts 53 engage links 54 the latter of which serve as end extremities for the elongate flexible saddle; saddle 41, preferably of webbed belting, includes edge extremity plates 55 and 56 which are bolted together by bolt means 57 and which are welded to the links 54 respectively engaging the two eyebolts 53. It is to be noted with particularity that the tightening down of eyebolts 53 by the rotation of nuts 58 shortens the effective length of the elongate flexible saddle between bearing members 39 so that the latter will tend to "ride up" the transverse contour 59 of vehicle 10. In practice, it is desirable that the nuts 58 be adjusted such that bearing members 39 will be disposed just outside the roof line of the automobile. See FIGURE 2 with RF delineating roof line. Thus, the saddle will be made sufficiently elongate (between bearing members 39, and by the adjustment of one or both nuts 58), so that maximum support may be enjoyed from the top of the vehicle without interfering with door-opening.

It will be noted from the above that the advantage of the saddle construction shown is in the distribution of the weight carried by the saddle over the entire top surface portion upon which the saddle rests. In being constituted by a single webbed belting, or by other convenient means, the surface character of the vehicle will not be marred as would be the case by the employment of suction cups, for example. Furthermore, much more weight may be accommodated by the vehicle than were the simple attachment to the drain strips employed. However, and simply for purposes of insuring a good anchor, optionally included will be ring mounts 60 welded or otherwise secured to cross-bar 42 for accommodating straps 61 having conventional drain strip fittings 62 slideably disposed thereon and adjustably retained by means of buckles 63. The combination of elements 61 and 62 and 63 are strictly conventional.

In FIGURE 6 is illustrated the situation wherein the upstanding portion 64 of depending leg 38 is drilled and tapped at 65 for receiving retaining bolt or screw 66 threaded therein and engaging the upper surface 67 of channel beam 17. Otherwise, the saddle construction remains the same.

It is to be noted with reference to FIGURE 1 that the construction of support means 21 and the engagement thereof with rear bumper 12 will preclude a forward shifting of the frame construction 15′ with its load at 37 during periods of vehicle deceleration. It has been found through practice, even where bumper clamps are not employed at 12 (even though conceivably such might be used), the coefficient of sliding friction between the webbed saddle 41 and the vehicle top 11 will be sufficient, with the drain strip connections as at 61, to preclude inadvertent rearward shifting of load during acceleration intervals.

It will be noted from the above description that the frame construction and load may be supported on opposite sides by the engagement of members 31 and the jack construction illustrated with receptacles 32 of frame 15′. Thus, the vehicle may be driven underneath the jacked support structure, the support means 21 installed, and the saddle constructions 41 slid along the longitudinal beams 16 to appropriate positions along the top of the car; then the jacks and associated equipment may be removed and nuts 58 in FIGURE 2 tightened so that the saddles achieve a desired configuration relative to the transverse contour of the vehicle top. Subsequently, set screws 43 in FIGURE 2 or 6 in FIGURE 6 may be tightened so as to lock the frame 15′ with respect to the saddle constructions at 38. Finally, the drain strip attachments at 61 will be adjusted to engage the drain strips 14 of the vehicle.

For rigidity in the support structure it is advantageous and, in fact, eminently desirable that there be included truss means 64 and 65 comprising chain C and turnbuckle D means and which span in divergent planes the junctures of support means 21 and frame 15′. The inventor's copending applications are again referenced as to this point.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A support structure for a vehicle including, in combination, a horizontal frame to be positioned above the top of a vehicle carrying the same, support means engaging the rear of said frame and means to engage the rear bumper of said vehicle, for support of said support means, and at least one, elongate, flexible saddle means disposed transversely with respect to and spaced underneath said frame and so constructed and arranged as to be adapted to conform to and uniformly receive the transverse contour of the top of said vehicle at a selected region thereof, and means for constraining said elongate saddle means in spaced relationship with respect to said frame, to enable said saddle means to conform to said vehicle top transverse contour, under the load of said frame, and wherein said constraining means includes a cross-bar disposed underneath and extending substantially beyond the outer edges of said frame and supporting said frame, means respectively affixed to the extremities of said cross-bar and to the extremities of said saddle means for securing the same respectively together, said constraining means further including mutually spaced, depending leg means affixed to and depending from said cross-bar and thrustingly and slidably engaging said saddle means at medial areas thereof under the load of said frame, spacing said saddle means below said cross-bar and delineating that portion of said saddle means which encompasses the transverse periphery of said vehicle which is received thereby.

2. Structure according to claim 1 wherein said depending leg means are rounded at their areas of engagement with said saddle means.

3. Structure according to claim 1 wherein said securing means includes at least one take-up bolt means for varying the effective length of said saddle means.

4. As a support for supporting a support frame above a vehicle having a top, in combination, an elongate, flexible, saddle means for transverse disposition over said vehicle top to engage the same, medially following the contour thereof; rigid, elongate means transversely positionable horizontally over said vehicle and disposed directly above said flexible saddle means; a pair of spaced, leg means effixed to and depending from said rigid means and having bearing extremities slideably engaging said flexible saddle means, and a pair of means respectively secured to and between opposite extremities of said rigid elongate means and the opposite extremities of said flexible saddle means for constraining that portion of said flexible saddle means disposed between said leg means to the transverse contour of said vehicle top under the load of said support frame, at least one of said constraining means being length-adjustable.

5. As a support for supporting a support frame above a vehicle having a top, in combination, an elongate, flexible, saddle means for transverse disposition over said vehicle top to engage the same, medially following the contour thereof; rigid, elongate means transversely positionable horizontally over said vehicle and disposed directly above said flexible saddle means; a pair of spaced, leg means affixed to and depending from said rigid means and having bearing extremities slideably engaging said flexible saddle means, and a pair of means respectively secured to and between opposite extremities of said rigid elongate means and the opposite extremities of said flexible saddle means for constraining that portion of said flexible saddle means disposed between said leg means to the transverse contour of said vehicle top under the load of said support frame, both of said constraining means being length-adjustable.

References Cited in the file of this patent

UNITED STATES PATENTS

| | | |
|---|---|---|
| 2,306,537 | Hamm | Dec. 29, 1942 |
| 2,479,035 | Burkey | Aug. 16, 1949 |
| 2,800,264 | McFadyen | July 23, 1957 |
| 2,859,887 | Haight | Nov. 11, 1958 |

FOREIGN PATENTS

| | | |
|---|---|---|
| 1,123,398 | France | June 11, 1956 |
| 1,172,115 | France | Oct. 13, 1958 |